United States Patent [19]

Laderach

[11] 3,927,588
[45] Dec. 23, 1975

[54] ASEPTIC SLICING MACHINE FOR FOOD PRODUCTS, AND METHOD

[75] Inventor: Hans Rudolf Laderach, Basenheid, Switzerland

[73] Assignee: Micarna AG Fleischwarenfabrik, Bazenheid, Switzerland

[22] Filed: July 22, 1974

[21] Appl. No.: 490,518

[52] U.S. Cl. .................... 83/15; 83/170; 83/171; 99/517; 426/518; 426/524
[51] Int. Cl.² .................... A23B 4/06; B26D 4/22
[58] Field of Search ................ 83/15, 16, 170, 171; 99/517; 426/518, 524

[56] References Cited
UNITED STATES PATENTS

| | | | |
|---|---|---|---|
| 2,501,261 | 3/1950 | Budge | 83/171 X |
| 3,832,923 | 9/1974 | Lassmann et al. | 83/16 |
| 3,855,912 | 12/1974 | Schoonmaker et al. | 99/517 X |

*Primary Examiner*—Willie G. Abercrombie
*Attorney, Agent, or Firm*—Flynn & Frishauf

[57] ABSTRACT

To prevent accelerated spoilage of sliced food products, particularly meat, cold cuts and the like, the knife of a slicing machine is heated so that it will have continuously, a temperature which it is high enough to be sterilizing temperature, over 100°C, and preferably in the order of about 120°C. The knife is preferably heated by blowing air at a temperature between 200°C and 350°C against the knife blade. The solid, or block food products are protected by a hood, into which sterilized cool air is introduced, for example, in the order of ambient temperature, such as between 18°C and 28°C, and a sterile atmosphere is additional preferably enhanced by operating an ultra violet lamp within the hood. The sliced food products are transported away from the cutting blade by a protected transport path, and protected by a hood, and, preferably cooled, in an atmosphere of sterilized air, at a slight overpressure, and preferably also in the presence of UV radiation so that they can be packaged under sterilized conditions and contamination of the sliced top faces of food products, prior to packaging, is inhibited.

11 Claims, 3 Drawing Figures

ASEPTIC SLICING MACHINE FOR FOOD PRODUCTS, AND METHOD

The present invention relates to a method to aseptically sever food products and particularly meat and sausage products to prepare cold cuts, and like, by means of a slicing machine.

It is well known that the storage capability of meat products, sausages and the like which is cut in slices is less than similar products in block, or bulk form. It is of substantial importance in super market and self-service establishments to be able to sell sliced meat products in packaged form. Spoilage is, however, a continuous problem and it is of importance that the storage time of sliced meat, meat products, sausages, and the like, can be extended. Numerous attempts have been made to increase the storage time, and retard spoilage of sliced meat products, for example by means of vacuum packing. Unfortunately, it has been found that meat products which have a tendency to spoil can not be stored, satisfactorily, for extended periods, even when vacuum packed and kept at low temperatures, for example, in refrigerators, in refrigerated display cases.

It is the object of the present invention to increase the storage time capability of sliced cut meat and sausage products, so that they can be packaged, as sliced products for sale as packaged units in self-service establishments.

SUBJECT MATTER OF THE PRESENT INVENTION

Briefly, the slicing knife of the cutting machine, sequentially severing slices of food product from a bulk supply is continually maintained at the temperature which is at least the minimum sterilizing temperature. In accordance with a preferred form of the invention, the region of the slicing machine or which the knife or cutting blade operates, and preferably, also the feed roll for the bulk meat products supply and the transport path carrying the severed slices away, are shrouded by one or more hoods, into which sterilized air is introduced. Heated air, for example in a temperature range of between 200°C and 350°C is blown against the cutting knife, to keep the cutting knife at a temperature above 100°C. A temperature range from between 100°C and 130°C is suitable and a temperature in the order of about 120°C is preferred. Sterility of the surrounding of the cutting operation can be additionally enhanced, in accordance with the feature of the invention, by introducing a source of ultra violet radiation in the hood shielding the bulk and the severed meat product.

It is believed that the undesirable storage capability of sliced or cut meat products appears to be primarily due to the introduction of germs, and the like, during the cutting operation and particularly by the cutting knife. The cutting knife, customarily of the rotary type, touches the entire cut surface of each severed slice. Any germs and bacteria, other contaminants in ambient air and on the outer surface of bulk meat products are distributed by the cutting knife over the surface of the freshly cut slice. By heating the cutting knife to sterilization temperature, germs, bacteria and other contaminants are not transferred to the cut out surface of the freshly cut slices, thus substantially increasing the storage time of the sliced products.

The invention will be described by way of example with reference to the accompanying drawings, wherein.

Figure 1:
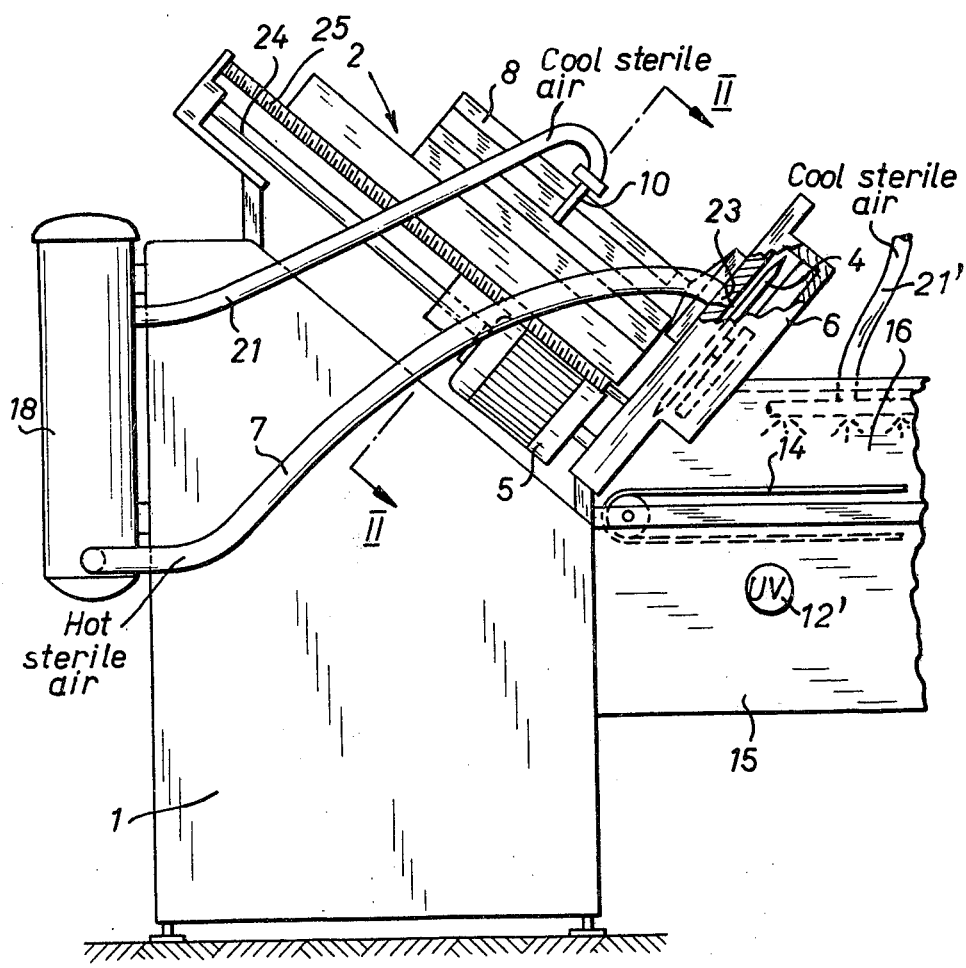
FIG. 1 is a highly schematic side view of a slicing machine to which sterile air is supplied, all parts unnecessary for an understanding of the present invention having been omitted.
Figure 2:
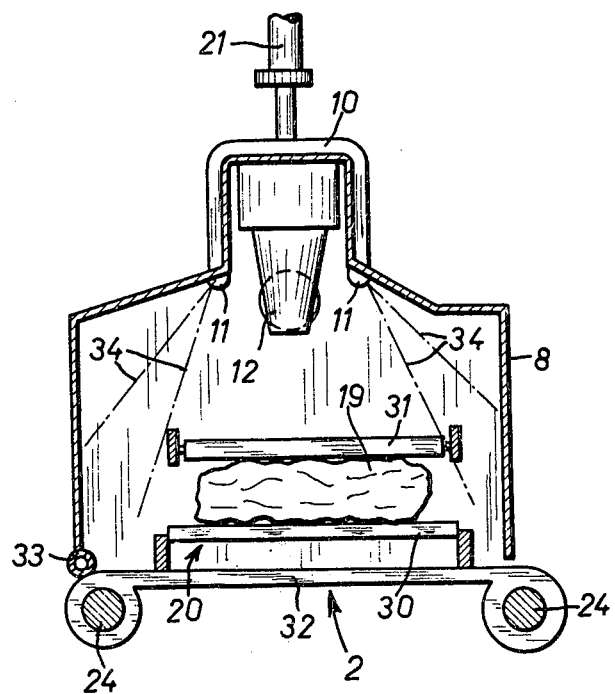
FIG. 2 is a section with a long line II—II, of FIG. 1, and through the bulk food feed transport slide of the slicing machine.

The slicing machine itself may be any type of commercially available and well known meat slicing machine. Basically, a frame or housing (FIG. 1) supports an inclined slide 2 on which the bulk food product 19 (FIG. 2) is retained. The slide 2 is secured by a pair of cylindrical rods 24. The bulk food product 19, shown only schematically, is secured on the slide by a feed transport chain system 20, having upper and lower horizontal connected bars, 30–31. Slide 2 is covered by a hood 8 which can tilt about hinge 33.

Slicing is done by a rotary cutting blade 4, driven by a motor, which rotates about its own axis. The axis of rotation of blade 4 is further secured to a rotating excenter so that the cutting blade 4 carries out a to-and-fro reciprocating, swinging motion, in which the cutting blade 4 is carried in front of the bulk food product 19 to cut off a slice, and then is retracted away from the bulk product 19 so that the bulk product can be fed by the thickness of the slice, for subsequent severing by the cutting knife, which again passes over the bulk product 19. The bulk product 19 is fed by a feed spindle 25 driven by a motor 5. Slicing machines are well known.

The cutting blade 4 is protected from ambient air surrounded by a protected housing 6; a hot air duct 7 terminates in housing 6. The hot air duct 7, preferably, is a flexible heat-resistant hose. The hot air duct 7 terminates in a nozzle 23 which directs sterile heated air coming from the hot air duct 7, against the cutting blades 4. Cutting blade 4 is heated continuously to a temperature which is at least sterilization temperature. The temperature of the hot air itself is higher than the cutting knife 4 which is continuously cooled by contact with the bulk food product during the cutting operation. The temperature at which the cutting blade or knife 4 is continuously maintained is preferably in the order of about 121°C, and should be in the range of between 100°C and 130°C. Hot air blown against the cutting knife or blade 4 preferably is in a temperature range of about 200°C to 350°C.

Nozzle 23 may include a pipe stub, located parallel to the cutting plane of the knife 4, which is formed with a plurality of openings directed against the cutting blade 4. The region or zone in the vicinity of the cutting blade 4 is thus subjected to a slight over-pressure due to the introduced hot air, which prevents penetration of non-sterile ambient air, and protectively surrounds the cutting blade. The hot air may escape through openings, not further shown, or leak and other cracks in the protective hood housing 6.

In accordance with a feature of the invention, the air within hood 8 is also sterile. A sterile air supply hose 21 is collected through a sterile air duct 10 leading into the hood 8. Sterile air blown into the inside of hood 8 through distribution nozzle 11. Direct air blast 34 is so directed that a curtain of sterile air is formed around the bulk food product. The temperature of the introduced sterile air may be at ambiant temperature, and preferably in the range of about 18°C to 28°C. Over pressure of sterile air will result beneath the hood 8, so that non-sterile ambient air from the outside of the cutting machine can not reach the bulk food product. An ultra violet lamp 12 is located within the hood 8. Such lamps have bacteriostatic effect.

The sliced meat product, cut by the blade 4 drops on a continuously movable transport belt 14. Transport belt 14 is part of a transport system, located on a table 15. The transport system is covered by a hood 16 which, in cross section, is generally U-shaped. The transport belt 14 is endless; UV radiation is directed by lamp 12' on the lower side of the endless transport belt 14 during its return run, so that the belt itself is sterilized. The cut slices on the transport belt are transported to a packaging machine, for example, through an automatic packaging machine through which they are packaged under sterile conditions.

Figure 3:
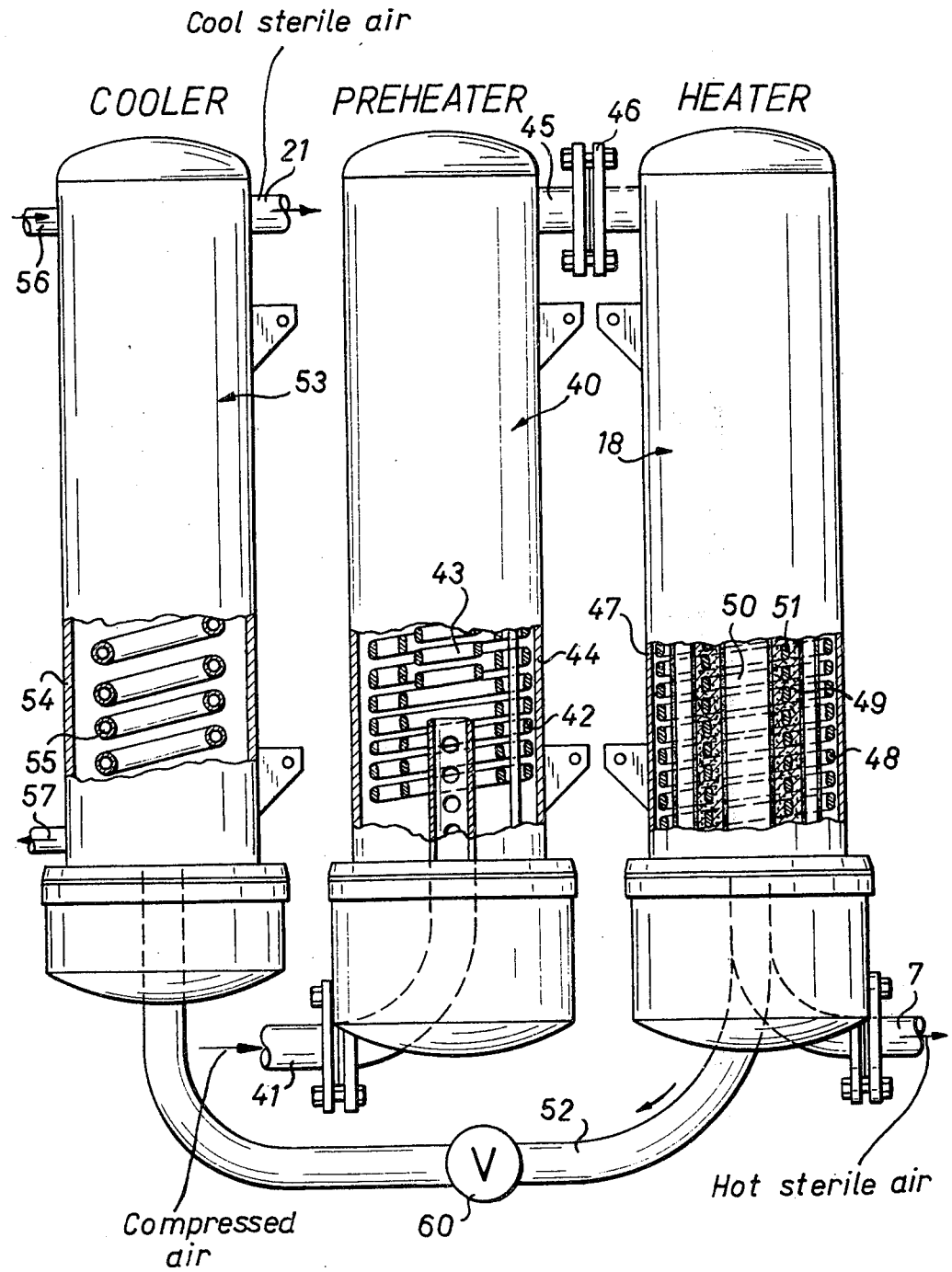
FIG. 3 is a schematic side view of the sterile air generating system, with parts of the housings drawn broken away and illustrating the interior, in section.

The sterile air is generated, as best seen in FIG. 3, by a sterile air generating system which includes a preheater 40, a main heater 18, and a cooling unit 53. The three separate units are secure to housing 1, one behind the other, so that only one thereof is visible in FIG. 1. Air supplied over duct 41, for example open to ambient air, is preheated in the cylindrical preheater 40; thereafter, it is conducted to a main heater 18 which is combined with a air heater 49, to bring the air to the desired temperature of between 200° and 350°C. By heating and filtering, sterile hot air is obtained. A portion of this hot air is conducted by hose 7 to be directed to knife 4. Another portion of this sterilized hot air is conducted by duct 52, which includes a valve, to a cooling unit 53, in which the sterile air is cooled to approximately room temperature, for example to between 18°C to 28°C. This cooled sterilized air is then supplied by means of hose 21, or by means of any other suitable means of conduit or tube to hose 21 and similar hoses (not shown) into the interior of the hood 16 surrounding the transport belt 14. Suitable control valves are provided to control the portions or fractions of the cooled sterilized air supplied through the valves to the enclosed hooded chambers.

Ambient air, at a pressure higher than ambient pressure, that is, pressure about from 3 to 5 bars are introduced over duct 41 into the interior of the cylindrical vessel 44, forming the preheater. Coiled electrical heaters 42, 43, are located within the vessel 44 to heat the introduced air. The upper end of the preheater vessel 44 includes an outlet stub 45 which is connected over a connecting flange 46 to an inlet stub integral with the heating vessel 47 of the main heating unit 18. A spiraled electrical heating element 48 is located within the cylindrical vessel 47, surrounding a tubular air filter 49, with radial spacing. Air filter 49 may be, for example, to sintered metal filter A further spiral heat element 51 is located within the porous air filter 49. The hot air which has penetrated through filter 49 is collected in the cylindrical vertical space 50, heated by filter 51, to be removed by hose 7 and by duct 52. That portion of the hot air which passes in duct 52 is cooled in cooling unit 53 to approximately room temperature. Cooling unit 53 may be for example, water cooler through which water is circulated. A cooling coil 55 is located within the vessel 54 forming the cooler. 53. Cooling water is circulated through the cooling coil 55, supplied by a line 56 and removed from an outlet duct 57. The sterilized air, now cooled, is removed from cooler 53 by duct 21 located at the upper end thereof. The cooler may equally well be constructed in the reverse, that is conduct the air from duct 52 through a coil, surrounded by cooling water flowing through the vessel.

The entire zones or regions in the vicinity of the cutting operation is thus sterilized; cutting is accomplished aseptically, without complicating the cutting process, as such.

The cutting blade or knife 4 preferably is sterilized by heated air, as described; it may, however, be brought to sterilization temperature also by other means, for example by electrical resistance heating, induction heating, or flame heating, for example by means of a gas flame. Hot air is, however, preferred since, if the cutting knife should stop in a position exposed to the heating unit, localized hot spots which might damage the cutting knife are thereby avoided. The arrangement, thus, does not require expensive interlock apparatus to reduce localized heating; such localized heating cannot be interrupted, merely, upon interruption of the cutting operation since otherwise sterility of the entire process is vitiated.

Various changes and modifications may be made within the scope of the inventive concept.

The cooling and heating of air can be combined by operating the cooling unit in a compression-expansion refrigeration cycle; the condenser, to cool the refrigerant, can itself be cooled by air being introduced from pipe 41, and act either as a pre-cooling unit 40 or, at least in part, also as the main heater 18; the cooling system of the refrigeration cycle, after expansion of the refrigerant gas then can be located in cooler 53. Some additional heating energy may be necessary to bring the air to the temperature required to sterilize the knife 4. The air supplied over pipe 41, at overpressure, may already be pre-filtered. If the heating-cooling system includes refrigeration-cycle equipment, then the spiral resistance heater elements 43, 48, 51 may be replaced by spiralel tubings similar to tubing 55 which, additionally, preferably is finned to increase the heat exchange surface.

I claim:

1. Method of aseptically severing meat products, sausage products, cold cuts, and the like, utilizing a slicing machine having a moving cutting knife sequentially severing slices of said meat products from a bulk supply comprising the step of continually blowing air at a temperature in excess of 100° C against said cutting knife to continuously maintain the cutting knife (4) of the slicing machine during the cutting operation at a temperature which is at least the minimum sterilization temperature and to heat the cutting knife to a temperature in excess of 100°C.

2. Method according to claim 1, wherein said blowing step comprises the step of blowing the air at the temperature in excess of 100°C against the cutting knife in a region remote from the end face of the bulk food product (19).

3. Method according to claim 1 wherein said airblowing step comprises constantly blowing sterilized air towards the cutting knife.

4. Slicing machine for aseptically severing meat products, sausage products, cold cuts and the like into slices comprising means (20, 30, 31)

supporting said food product (19) in unsliced, bulk form;

a cutting knife (40) movable back-and-forth across the bulk food product to sever slices therefrom comprising the improvement of means (18) heating air to sterilizing temperature and at least to 100°C;

at least one heated air outlet (23) connected to the air heating means (18) and located in the vicinity of the cutting knife (4) and continuously blowing heated air toward the cutting knife in a region remote from the end face of the bulk food product (19) to continuously heat the cutting knife to a temperature which is at least sterilizing temperature.

5. Machine according to claim 4 further comprising a hood (8) surrounding the food product (19); and means (21) supplying cold, sterilized air beneath the hood to surround the food product and provide a region of over pressure of sterilized air beneath said hood.

6. Machine according to claim 5 further comprising a source of ultra violet radiation (12) located beneath the hood and irradiating the space there beneath, in which the food product are located.

7. Machine according to claim 5 wherein the air heating means comprises an air heater (18) heating air through and to sterilizing temperature;

a cooling unit (53) is provided, connected to receive at least a portion of said heated sterilized aiar and cooling said heated sterilized air;

and connecting means to connect said cool, heat-sterilized air to a duct (10) and to the hood (8).

8. Machine according to claim 7 wherein the hood is (8) located to surround the bulk food product (19) being fed to the knife (4).

9. Machine according to claim 4 further comprising a removal transport means (14) located to remove sliced food products;

wherein the improvement comprises a hood (16) covering said transport means and said slices thereon;

and means sterilizing the air surrounding said sliced food products.

10. Machine according to claim 9 wherein the means sterilizing the air surrounding the sliced food product comprise duct means (21) supplying sterilized air to a sliced food product.

11. Machine according to claim 4 further comprising endless transport means having a removal path and a return path therebeneath and located to remove sliced food product, wherein the improvement comprises means sterilizing the transport means while in the return path including a source of ultra violet radiation (12') located to irradiate the transport means while in the return path.

* * * * *